United States Patent [19]
Goda

[11] 3,730,398
[45] May 1, 1973

[54] LIQUID DISPENSING APPARATUS

[76] Inventor: George G. Goda, 390 First Avenue, New York, N.Y.

[22] Filed: June 14, 1971

[21] Appl. No.: 152,637

[52] U.S. Cl. .................... 222/309, 92/60.5, 222/385
[51] Int. Cl. ............................................. G01f 11/06
[58] Field of Search .................... 222/211, 309, 382, 222/383, 384, 385, 464, 542; 417/566, 274; 92/60.5

[56] References Cited

UNITED STATES PATENTS

| 2,605,019 | 7/1952 | Cornelius | 222/385 |
| 2,986,098 | 5/1961 | Trouti et al. | 417/566 |
| 2,639,063 | 5/1953 | Yuza | 222/109 |
| 2,587,241 | 2/1952 | Steele | 222/309 |

FOREIGN PATENTS OR APPLICATIONS

| 751,165 | 6/1956 | Great Britain | 222/385 |

Primary Examiner—Robert B. Reeves
Assistant Examiner—Larry Martin
Attorney—Martin Novack

[57] ABSTRACT

A combination syringe and cap assembly which is utilized for dispensing predetermined amounts of liquid from a source bottle. The assembly is of compact and concise construction and can be manufactured inexpensively.

12 Claims, 2 Drawing Figures

PATENTED MAY 1 1973

INVENTOR.
GEORGE G. GODA

BY M. Novack
ATTORNEY.

LIQUID DISPENSING APPARATUS

BACKGROUND OF THE INVENTION

This invention relates to liquid dispensing systems and, more particularly, to an apparatus for dispensing a predetermined amount of liquid from a dispensing bottle.

The subject matter of the present invention is related to subject matter disclosed in the copending U.S. Pat. applications of G. Goda entitled Liquid Check Valve Assembly, Ser. No. 152,635, and Adjustable Dispensing Apparatus, Ser. No. 152,636, both filed of even date herewith.

There have been previously described various systems for dispensing predetermined amounts of liquid from a jar or bottle. Among the usual considerations in designing such a system are the following: The system should be relatively accurate and, preferably, adjustable to dispense different predetermined amounts of liquid. The system should be of compact construction and capable of disassembly for convenient cleaning and maintenance. Also, the system should not be unduly expensive of manufacture.

Unfortunately, the above considerations are found to be countervailing. The desire for more accurate systems has generally resulted in more complex configurations which are proportionally more expensive. As complexity increases, such systems typically become less maintainable. Furthermore, if an adjustable system is desired, an additional expensive adjustment mechanism may be required to perform an adequate job. It is accordingly an object of this invention to provide an easily adjustable dispensing system of compact and concise construction which offers relatively accurate performance and can be manufactured without undue expense.

SUMMARY OF THE INVENTION

The present invention is directed to a combination syringe and cap assembly which is utilized for dispensing a predetermined amount of liquid from a source bottle. A circular pressure plate having an aperture centrally located therein is provided. The plate has a circumference substantially equal to that of the rim of the bottle mouth and is adapted to rest on the bottle lip. A cylindrical barrel having a top annular flange is proportioned to fit through the aperture so that the flange rests on the pressure plate. The barrel narrows to form an inlet/outlet tip at the bottom thereof. A tubular spacing member is proportioned to fit within the barrel. A cap having a circular aperture centrally located therein is adapted to grasp the outer rim of the bottle mouth and thereby secure the flange against the pressure plate. An elongated plunger is slidably fitted within the spacing member and extends through the apertures to a distance substantially above the top of the barrel. The plunger has a tip fitted to the inner dimension of the barrel below the spacing member. In operation, the stroke of the piston is determined by the length of the spacing member. If it is desired to change the amount of liquid displaced by the plunger, the assembly can be quickly and easily disassembled and then reassembled with a spacing member of appropriate length.

Further features and advantages of the invention will become more readily apparent from the following detailed description when taken in conjunction with the accompanying drawings.

DESCRIPTION OF THE PREFERRED EMBODIMENT

Figure 1:
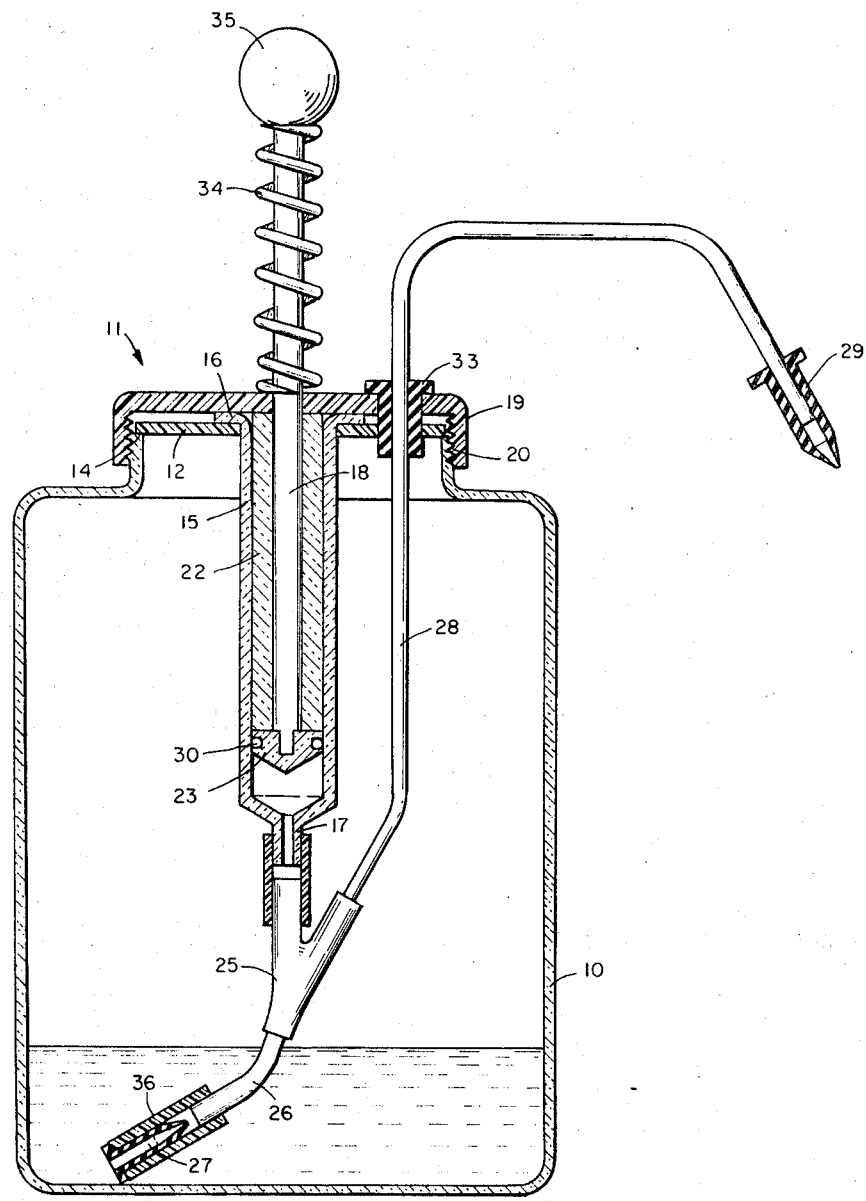
FIG. 1 is a view in section of the dispensing apparatus of the invention.
Figure 2:
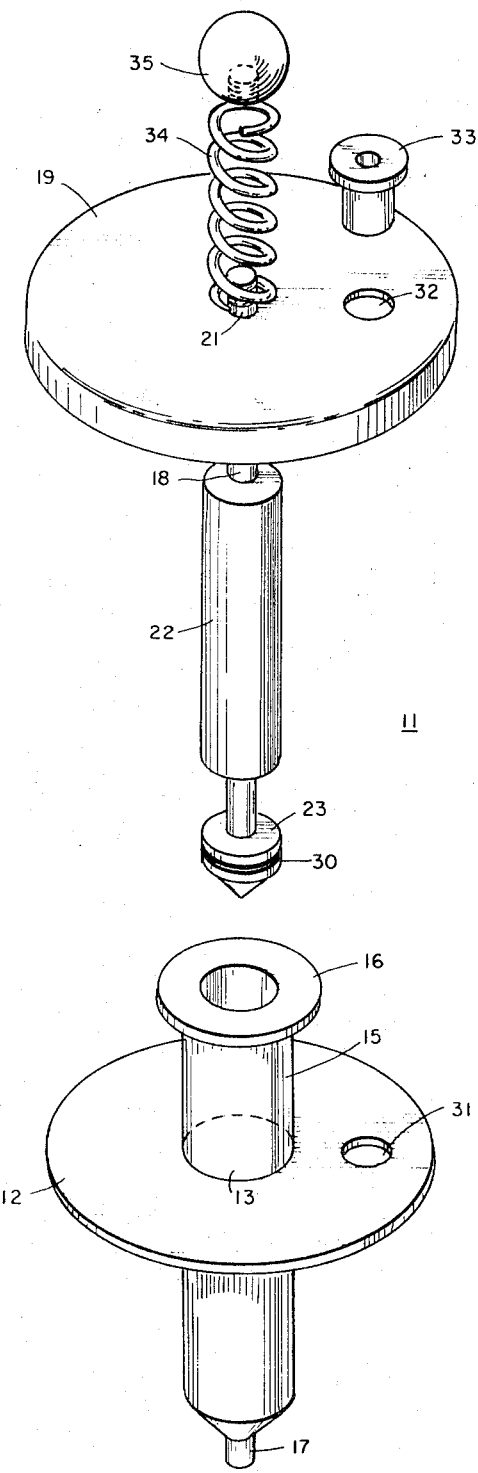
FIG. 2 is a partially exploded perspective view of the cap and syringe assembly of FIG. 1.

Referring to FIGS. 1 and 2 there is shown a bottle 10 containing a liquid and having secured thereto a cap and syringe assembly 11 in accordance with the invention. A circular pressure plate 12, having a circular aperture 13 located centrally therein, is positioned to rest upon the lip 14 of the bottle. A cylindrical syringe barrel 15 is provided with a radially extending flange 16 at the top end thereof. The barrel narrows at its bottom end to form an inlet/outlet tip 17. The outer dimension of the barrel is proportioned to fit through the aperture 13 so that the flange 16 can rest on the pressure plate 12.

A cap member 19 is provided with a centrally located circular aperture 21. The cap has an inner threading 20 such that it can be screwed onto the bottle 10 which has threading on the outer rim of its mouth. The tightening of the cap 19 secures the flange 16 between the plate 12 and the inner surface of the cap.

A tubular spacing member 22 is slidably fitted within the barrel 15 and has a length which is necessarily somewhat shorter than that of the barrel 15. An elongated plunger 18 is slidably fitted within the spacing member 22. The plunger extends through the apertures 13 and 21 to a distance substantially above the top of the barrel 15. The plunger includes a tip 23 which is closely fitted within the portion of barrel 15 below the spacing member 22. The plunger tip 23 has an annular groove which receives a teflon o-ring 30 to insure a slidable seal with inner surface of the barrel 15. The cap, syringe, pressure plate and spacing member may all be formed of a firm plastic.

The inlet/outlet tip 17 is coupled through the "Y"-connector 25 and plastic tubing 26 to inlet check valve 27. A branch passageway of the connector 25 additionally couples the inlet/outlet tip 17 through plastic tubing 28 to the outlet check valve 29. The plate 12 and cap 19 have respective secondary apertures 31 and 32 which receive the hollow hard rubber bushing 33 that allows passage of the tube 28 out of the bottle. A biasing means in the form of coil spring 34 surrounds the upper section of the plunger 18. The top of the plunger is threaded so that a ball handle 35 having an appropriate threaded cavity can be secured thereto.

The "duck-bill" type of check valves depicted in FIG. 1 are particularly suited to the invention and keep within the spirit of composite and inexpensive design. The valve 29, for example, is simply constructed of a tubular piece of flexible rubber which narrows and flattens to form valve lips. The lips are a sufficient seal to prevent liquid flow until a fluidic pressure is applied by pumping, whereupon the lips are forced temporarily open. The valve 27 is of the same construction, but reversed within a tubular plastic housing 36. It will be appreciated, that other types of check valves can be utilized if desired. As an example, the copending Goda application entitled Liquid Check Valve Assembly, referred to above, discloses a suitable check valve.

The operation of the dispensing assembly involves merely the depressing of the plunger 18 to its lower limit. The liquid in the lower portion of the barrel 15 (assuming previous priming) is forced through tube 28, the resultant pressure opens the valve 29, and the liquid is expelled. The valve 27 is closed during this phase of operation. When the plunger is released, the spring 34 biases it to its fully raised position, and the resultant pressure differential causes the valve 27 to open and allow liquid from the bottle to refill the barrel. During this upstroke the valve 29 is, of course, closed. The length of the piston stroke and, accordingly, the amount of liquid dispensed, depends upon the length of the specer 22 which limits the piston upstroke.

In the embodiment of FIG. 1, the tube 28 is shown as being of a semi-rigid plastic of relatively short length. It will be understood, however, that a more flexible tubing of greater length could be conveniently utilized for dispensing at a distance from the bottle 10. The advantages of such remote dispensing and of utilizing a check valve at the end of the output tube are described in the copending Goda U.S. Pat. application entitled Adjustable Dispensing Apparatus, referred to above.

The assembly and/or disassembly of the invention can be quickly and easily accomplished and a spacer 22 of required length inserted to meet a prescribed dispensing need. The assembly operation can be readily visulized with the aid of FIG. 2. Briefly, the barrel 15 is inserted in the aperture 13, and the piston 18, with spacer 22 placed thereon, is inserted in the barrel. The cap, spring, and handle can then be assembled over the plunger as shown. As the cap 19 is screwed on the bottle, the bushing 33 will normally rotate the pressure plate 12 along with the cap.

I claim:

1. In an apparatus for dispensing a predetermined amount of liquid from a bottle, a composite syringe and cap assembly comprising:
   a. a circular pressure plate adapted to rest on the rim of the mouth of said bottle, said plate having an aperture centrally located therein;
   b. a cylindrical barrel proportioned to fit through said aperture, said barrel having a bottom inlet/outlet tip and a top annular flange extending radially therefrom and adapted to rest on said plate;
   c. a tubular spacing member proportioned to slidably fit within the upper portion of said barrel;
   d. a cap member having an aperture centrally located therein, said cap member adapted to fit on the outer rim of said bottle mouth and thereby secure said flange against said pressure plate; and
   e. an elongated plunger fitted within said spacing member, said plunger having an upper section which extends through said apertures to a distance substantially above the top of said barrel and a lower tip section which is slidably fitted in the portion of said barrel below said spacing member.

2. The assembly as defined by claim 1 further comprising means for biasing said plunger to its uppermost position as a rest position.

3. The assembly as defined by claim 2 wherein said biasing means comprises a coil spring surrounding the upper section of said plunger.

4. The assembly as defined by claim 3 further comprising a removable handle secured to the top of said plunger.

5. The assembly as defined by claim 1 wherein said pressure plate and said cap member each have second apertures therein, and further comprising a first check valve means adapted for placement within said bottle and coupled to said inlet/outlet tip, and an output tube having one end also coupled to said inlet/outlet tip and adapted to extend out of said bottle through said second apertures.

6. The assembly as defined by claim 5 further comprising a second check valve means coupled to the other end of said output tube.

7. The assemble as defined by claim 6 wherein said first check valve is a duck-bill type valve.

8. The assemble as defined by claim 7 wherein said second check valve is a duck-bill type valve.

9. Apparatus for dispensing a predetermined amount of liquid from a bottle comprising:
   a. a circular pressure plate adapted to rest on the rim of the mouth of said bottle, said plate having first and second spaced apertures located therein;
   b. a cylindrical syringe barrel proportioned to fit through said first aperture, said barrel having a bottom inlet/outlet tip and a top annular flange extending radially therefrom and adapted to rest on said plate;
   c. a tubular spacing member proportioned to slidably fit within the upper portion of said barrel;
   d. a cap member having first and second spaced apertures located therein, said cap member adapted to fit on the outer rim of said bottle mouth and thereby secure said flange against said pressure plate;
   e. an elongated plunger slidably fitted within said spacing member, said plunger having an upper section which extends through the first apertures of said pressure plate and cap member to a distance substantially above the top of said barrel, and a lower tip section which is slidably fitted in the portion of said barrel below said spacing member;
   f. spring means for biasing said plunger to its uppermost position as a rest position;
   g. first check valve means adapted for placement within said bottle and coupled to said inlet/outlet tip; and
   h. an output tube having one end also coupled to said inlet/outlet tip and adapted to extend out of said bottle through the second apertures of said pressure plate and cap member.

10. The assembly as defined by claim 9 further comprising a second check valve means coupled to the other end of said output tube.

11. The assembly as defined by claim 10 wherein said first check valve is a duck-bill type valve.

12. The assembly as defined by claim 11 wherein said second check valve is a duck-bill type valve.

* * * * *